Patented Dec. 28, 1948

2,457,754

UNITED STATES PATENT OFFICE 2,457,754

PROCESS OF EXTRACTING DIASTASE

Irwin W. Tucker and Arnold K. Balls, Washington, D. C., assignors to the United States of America as represented by the Secretary of Agriculture No Drawing. Application April 22, 1943, Serial No. 484,080

3 Claims. (Cl. 195—66)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the production of alcohol from wheat, and has among its objects a process of separating diastase from wheat grain products, whereby the conversion of starch to sugar may be effected without the additional use of malt or other diastase preparation, and such other objects as will be apparent from the following description and claims.

In the art of fermenting grains to alcohol, the starch content in the grain is the carbohydrate from which the alcohol is formed. The prior art processes in general involve the hydrolyzing of starch to sugar by action of the enzyme, diastase, and fermenting of the sugar to form alcohol by action of the enzymes contained in yeast.

Heretofore, in the production of alcohol from wheat it has been necessary to supply diastase from an outside source, usually from malt or other diastase preparations. This is an added expense which is eliminated in the process of this invention.

It is known that diastase is present in most grains in their natural state. It is also known that such diastase can, to a limited extent, be extracted from the grains by water, and can be more completely extracted by additional action of the proteolytic enzymes. This indicates that the diastase is bound to an insoluble protein which, when digested by a proteolytic enzyme, liberates the diastase, which can then be dissolved in water. Furthermore, it is known that most grains also contain proteolytic enzymes, but these enzymes in some of the grains are, in their natural state, very inactive.

In general, this invention comprises a process whereby the proteolytic enzymes of wheat are activated by aqueous solutions of a suitable reducing agent, resulting in action of the proteolytic enzymes on the proteins to cause liberation of the diastase. The diastase can thus be more completely extracted by water in a form available for use in conversion of the starch to sugar.

There are many reducing agents which may be used in the process. The reducing action is a straight organic reduction, or addition of hydrogen, as exemplified by the reduction of cystine to cysteine, that is, the reducing agent is one which breaks the sulfur to sulfur bond of the proteolytic protein of the wheat and adds hydrogen to at least one of the sulfurs. It is essential that the reducing agent be one which does not destroy the enzymes.

All reducing agents are not equally good for the process, and some of them need to be neutralized. From the standpoint of economy and availability, certain $SO_2$ yielding agents, such as the sulphite salts, particularly sodium sulphite and sodium bisulphite, are preferred.

These are used in an aqueous solution, which cannot be too concentrated, since over-concentration will have a deleterious effect. With a sodium sulphite aqueous solution, for example, it has been found that increasing the concentration from about 0.01 percent to 0.10 percent gives an increasing yield of diastase, and that increasing the concentration beyond about 0.10 percent does not further increase the yield. However, somewhat higher percentage solutions may be used without a deleterious effect. The proper selection of a reducing agent and its concentration depends to some extent on the subsequent steps of the process, as will be explained more fully.

It has been found that applying the process to such grains as barley, or to malt, results in a somewhat higher extraction of diastase than by extraction with water alone. However, when applied to wheat grain products, such as wheat flour or bran, the increase in extracted diastase is very pronounced. The extraction from wheat with about a 0.10 percent sodium sulphite solution, for example, has been found to be almost seven times as great as that with water alone.

The amount of diastase thus extracted from a given quantity of wheat is ample to hydrolyze all of the wheat starch contained in that quantity into sugar, and may be used for this purpose in treating a mash of the same wheat from which it is extracted, or may be used for the hydrolysis of starches from other sources.

In carrying out the process in general, diastase is extracted with the reducing agent preferably from ground wheat grain, flour, or bran, at a temperature below that which is destructive to the enzyme. The extract may be then put aside until the remaining solid material has been cooked in the usual manner to gelatinize the starch, and has been cooled. The extract containing the diastase can then be mixed with the cooked mash, and will hydrolyze the starch to sugar. Thereafter, fermentation with yeast can be carried out in the usual manner.

The following example illustrates a specific application of the invention.

A sample of 1500 grams of wheat flour was mixed with 8 liters of water containing 15 grams of neutralized sodium sulphite, an excess of the amount required, and the mixture was held at a temperature of 45° C. for one hour, with stirring. It was then allowed to settle for an hour while held at the same temperature, after which 3600 cc. of clear supernatant diastase-containing liquid was syphoned off and set aside. The residual mass was heated to from about 80° to 90° C. for about an hour to gelatinize the starch, was then cooled to from about 60° to 65° C., and the diastase-containing liquid was then mixed into the resulting mash, the temperature being held constant for about one and one-half hours. The whole was then cooled to about 30° C., and was innoculated with a suspension of yeast to a concentration immediately after innoculation of about $10^7$ cells per cc. After about 64 hours of fermentation, alcohol in the amount of 4.4 proof gallons per bushel of wheat was obtained.

In the above example, the various factors, especially those relative to the heating for gelatinization of the starch and fermentation process, may be varied, and a better yield would be obtained by using the optimum conditions.

The ratio of the reducing agent solution to the grain product may be that ordinarily used for commercial processes for preparing the mash, such as about 30 gallons to 35 gallons per bushel of grain, or whatever ratio is suitable for the particular process contemplated.

In the procedure, as illustrated in the example, it is to be noted that the diastase-containing liquid also contains the excess reducing agent and that this agent is also added to the gelatinized starch and remains in the mash during fermentation. With this process, precaution in using a reducing agent which is not of such nature and concentration as to be destructive of the yeast must be taken. However, if the reducing agent be removed from the diastase-containing liquid prior to addition to the starch, this precaution need not be observed.

The principal advantage of the process is obvious. It saves the use of malt or other diastase preparations in production of alcohol, which at the present time, in the case of wheat, amounts to a cost of at least 5 percent of the total grain cost. It also provides a process for extracting diastase from wheat grain products.

A further advantage, however, resides in the fact that the residue of mash after fermentation and distillation can be easily dried to a non-hydroscopic material, that is conveniently handled and more suitable for feed than are the residues from the ordinary processes. Furthermore, the process can be applied to wheat bran to recover the diastase therefrom and the bran thereafter dried without a deleterious effect on its feed qualities.

Having thus described the invention, what is claimed is:

1. A process of extracting diastase from wheat grain products, comprising treating a wheat grain product with a neutralized aqueous solution of a sulphite salt, at a temperature below that which destroys enzymes, thereby to cause liberation of the diastase in water-soluble form, and recovering the liquid containing the diastase from the treated product.

2. A process of extracting diastase from wheat grain products, comprising treating a wheat grain product with a neutralized aqueous solution of a sodium sulphite salt of over about 0.01 percent concentration, at a temperature below that which destroys enzymes, thereby to cause liberation of the diastase in water-soluble form, and recovering the liquid containing the diastase from the treated product.

3. A process of extracting diastase from wheat grain products, comprising treating a wheat grain product with a neutralized aqueous solution of sodium sulphite of about from 0.01 percent to 0.10 percent concentration, at a temperature below that which destroys enzymes, thereby to cause liberation of the diastase in water-soluble form, and recovering the liquid containing the diastase from the treated product.

IRWIN W. TUCKER.
ARNOLD K. BALLS.

REFERENCES CITED

The following references are of record in the file of this patent:

UNITED STATES PATENTS

| Number | Name | Date |
|---|---|---|
| 45,793 | Fleishman | Jan. 2, 1865 |
| 1,826,467 | Harteneck | Oct. 6, 1931 |
| 1,955,112 | Curry | Apr. 17, 1934 |
| 2,001,925 | Thurber | May 21, 1935 |
| 2,132,250 | Wagner | Oct. 4, 1938 |
| 2,222,306 | Atwood | Nov. 19, 1940 |
| 2,228,717 | Bergquist | Jan. 14, 1941 |
| 2,291,009 | Unterkofler | July 28, 1942 |
| 2,322,313 | Phillips et al. | June 22, 1943 |
| 2,322,413 | Bishop | June 22, 1943 |
| 2,368,668 | Langford | Feb. 6, 1945 |

FOREIGN PATENTS

| Number | Country | Date |
|---|---|---|
| 677,662 | France | Jan. 12, 1931 |

OTHER REFERENCES

Balls and Hale: Proteolytic Enzymes of Flour Cereal Chem., vol. XIII, No. 1, Jan. 1936, page 58.

Jorgensen: On the Existence of Powerful but Latent Proteolytic Enzymes in Wheat Flour, Cereal. Chem., vol. XIII, No. 3, May 1936, pages 346–355.

Chemical Abstracts, 30:4881[2], Chrzaszcz and Janicki: Increase in the Amount of Active Amylase in Ungerminated Cereals by $H_2S$. Ibid., 30:1076[2], Chrzaszcz and Janicki: Protease Action on Protein of Ungerminated Cereal Grain and its Effect on the Amylolytic Power.

Sumner et al., Enzymes, Academic Press, Inc., publ. N. Y., N. Y., 1943, pages 82, 90.

Chemical Abstracts, 35:2174[5], Dull and Swanson: The nature of liberation of bound barley amylase as effected by salt solutions. Cereal Chemistry 18, 113–20 (1941).